United States Patent [19]

Itzkan et al.

[11] 4,151,486
[45] Apr. 24, 1979

[54] TUNABLE ALKALI METALLIC VAPOR LASER

[75] Inventors: Irving Itzkan, Boston; Robert T. V. Kung, Andover, both of Mass.

[73] Assignee: Avco Everett Research Laboratory, Inc., Everett, Mass.

[21] Appl. No.: 776,014

[22] Filed: Mar. 9, 1977

[51] Int. Cl.$^2$ ............................................. H01S 3/094
[52] U.S. Cl. .......................... 331/94.5 P; 331/94.5 G
[58] Field of Search ...................... 331/94.5 P, 94.5 G

[56] References Cited

PUBLICATIONS

Sorokin et al., *Applied Physics Letters*, vol. 22, No. 7, Apr. 1, 1973, pp. 342–344.
Sorokin et al., *Journal of Chemical Physics*, vol. 54, No. 5, Mar. 1, 1971, pp. 2184–2190.
Sorokin et al., *IEEE Journal of Quantum Electronics*, vol. QE-9, No. 2, Feb. 1973, pp. 227–230.
Tah-no et al., *IEEE Journal of Quantum Electronics*, vol. QE-9, No. 3, Mar. 1973, pp. 423–424.

*Primary Examiner*—William L. Sikes
*Assistant Examiner*—Marcus S. Rasco
*Attorney, Agent, or Firm*—Frederick, Melvin E.

[57] ABSTRACT

A tunable alkali metallic vapor laser system is disclosed. Stimulated Raman scattering (SRS) in a low pressure atomic alkali metallic vapor of potassium or cesium is utilized wherein the atomic vapor is provided and then primed to populate an intermediate level such as the $4P_{\frac{1}{2}}$ level for potassium and the $6P_{\frac{1}{2}}$ level for cesium from which the desired upper laser level is accessible. After the population is created at the intermediate level, it is pumped to a virtual level near the desired upper laser level by a tunable dye laser and, via the SRS process, generates the tunable output laser beam.

15 Claims, 5 Drawing Figures

TUNABLE ALKALI METALLIC VAPOR LASER

This invention relates to lasers and, in particular, to tunable alkali metallic vapor lasers.

The biggest technological barrier to practical laser techniques for the enrichment of uranium isotopes is the lack of suitable lasers.

The major basis for interest in laser-induced photochemical enrichment of uranium is the potential efficiency of the technique. A gaseous-diffusion plant requires ten million times more energy to separate fissionable uranium-235 from the more common uranium-238 than the theoretical minimum of 60 joules per gram calculated from the entropy of mixing one gram of U-235 with 140 g of U-238. The centrifuge process requires only one-tenth the energy needed for gaseous diffusion, but laser techniques promise to be 100 times more efficient than the centrifuge. The laser approach also can provide higher enrichment factors per stage, thereby reducing energy requirements and size of a uranium-enrichment plant.

An important obstacle blocking laser applications in isotope separation and photochemistry is the lack of lasers with tunable infrared output, with the need for high power ultraviolet lasers a secondary problem. While fundamental and frequency doubled output of dye lasers can provide tunable output in the visible and ultraviolet, continuously tunable lasers with reliability and bandwidth comparable to those of dye lasers are not available in the 2.5 to 20-$\mu$m spectral range of molecular vibrations.

The wavelength requirements for isotope selection in UF$_6$ are severe: bandwidth of 0.07 cm$^{-1}$ or less and output at 7.74, 8.62, 12.1 or 15.9 $\mu$m. All the known anticipated applications require pulsed lasers, but energy and repetition rate vary among processes. Present energy requirements appear to range from several millijoules per pulse at 15.9 $\mu$m to tens of millijoules per pulse at 12.1 $\mu$m; a pulselength of one microsecond or less; and a repetition rate scalable up to 500 Hertz or more per laser. In addition to tunability, laser efficiency and output power are important factors in the economic feasibility of any laser isotope-separation technique because they affect both capital outlay and operating cost.

The present invention relies on the use of stimulated Raman scattering (SRS) in an atomic vapor. The SRS process is one of the earliest discovered nonlinear optical phenomenon since the advent of high power lasers. As early as 1962, large amounts of laser radiation in the Stokes shifted Raman lines were observed when many organic and inorganic liquids were placed inside a ruby-laser cavity. [E. J. Woodbury et al, Proc. I.R.E., 50, 2347 (1962)]. In 1968, SRS output was observed in high pressure H$_2$ gas pumped by a ruby-laser. Conversion efficiencies as high as 50% were observed in the H$_2$ Raman oscillator at pump power levels of the order of 100 MW/cm$^2$. [P. V. Avizonis et al, J. Appl. Phys., 39, 1752 (1968)]. While much of the work in the literature on SRS process has been devoted to vibrational Raman transitions where the transition oscillator strengths are relatively small, in atoms, only electronic Raman effects are present with inherently large oscillator strengths. Thus high conversion efficiencies may be achieved with relatively low pump power levels with attendant ease in pump laser requirements.

Beginning as early as 1967, electronic SRS process in atomic alkali vapor has been studied by various investigators. For a further discussion, see article by P. P. Sorokin and J. R. Lankard, IEEE, J.Q.E., QE-9, 227 (1973).

An object of the present invention is the provision of a tunable alkali metallic vapor laser.

Another object of the present invention is to provide tunable alkali metallic vapor lasers useful in the field of isotope separation and photochemistry.

Another object of the invention is the provision of tunable alkali metallic vapor lasers utilizing stimulated Raman scattering produced by a tunable laser in an alkali metallic vapor primed to an intermediate level.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
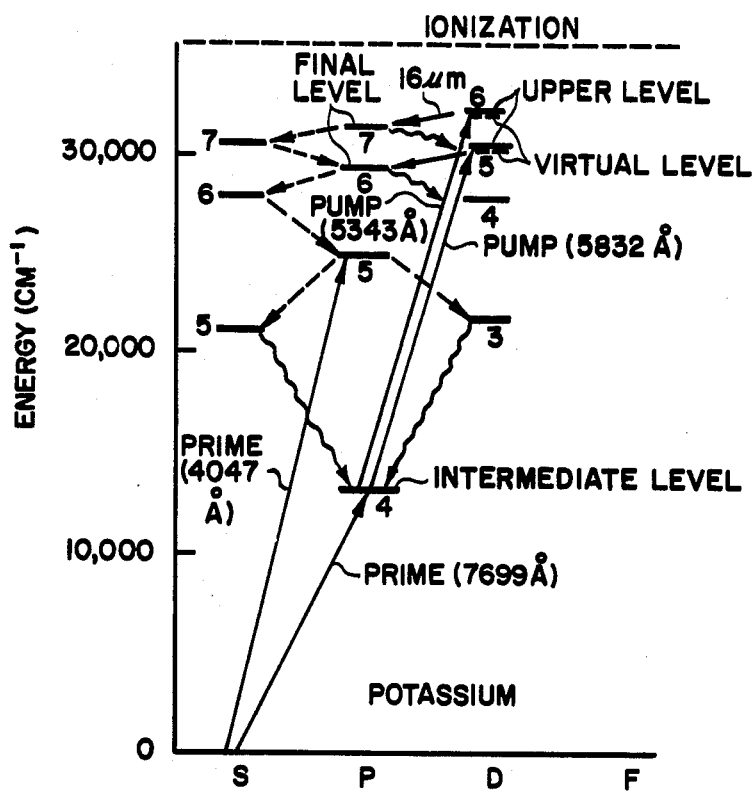
FIG. 1 is an energy level diagram for potassium showing priming and pumping steps in accordance with the invention.

For an understanding of the present invention, reference is made to FIG. 1 which is a schematic energy level diagram for potassium. While the present invention is not limited to the use of potassium or cesium for producing the alkali metallic vapor, discussion thereof is included for purposes of simplicity and convenience.

Directing attention now to FIG. 1, the potassium atom has a high lying transition between the 6D$_{3/2}$ and the 7P$_{1/2}$ levels with an energy spacing of 625.8 cm$^{-1}$. This energy spacing is in near coincidence with the 16 $\mu$m (625 cm$^{-1}$) and 15.9 $\mu$m (629 cm$^{-1}$) wavelengths which are relevant to enrichment of uranium as discussed hereinbefore. Since the appropriate wavelengths of interest are near a resonant transition, the scattering process via a virtual level (shown as dashed lines in FIG. 1) which is in close proximity with the 6D$_{3/2}$ real level results in large scattering cross sections. The utilization of resonant enhancement in the SRS process in accordance with the present invention allows for high photon conversion efficiencies with relatively moderate pumping laser intensities.

For 16 $\mu$m generation, after priming more fully described hereinbelow, a tunable pump source nominally at 5343 Å is used in the SRS process to induce an atomic Raman transition from the lower intermediate 4P$_{1/2}$ level to the 7P$_{1/2}$ final level. The 4P$_{1/2}$ intermediate level can first be prepared or primed directly via a conventional dye laser tuned to 7699 Å or indirectly by a laser tuned to 4047 Å. For the case of the 7699 Å laser, its output beam at 7699 Å should have sufficient energy per unit area to saturate the $4S_{1/2}$ to $4P_{1/2}$ levels. Alternatively, a 7665 Å ($4S_{1/2} \rightarrow 4P_{3/2}$) and 4044 Å ($4S_{1/2} \rightarrow 5P_{3/2}$) dye laser may be used respectively for a direct and indirect 4P level preparation or priming process. In those cases where a 4047 Å priming laser beam is used, the $4P_{1/2}$ level is primed via the stimulated Raman transitions $4S \rightarrow 5P \rightarrow 5S$ and $4S \rightarrow 5P \rightarrow 3D$ which populates the 5S and 3D levels and results in an inversion between these levels and the 4P level. Lasing near 1.25 and 1.17 μm results in the desired population of the 4P intermediate level. However, as noted above, the 4P level may also be populated by direct saturation pumping at 7699 A. Irrespective of how populated, radiation trapping maintains the population density of the 4P intermediate level on a time of the order of 1 microsecond, determined mainly by collisional quenching. The dashed arrows in FIG. 1 indicate cascade channels that bring the $7P_{1/2}$ final level back down to the $4P_{1/2}$ intermediate level from which recycling back to the $7P_{1/2}$ level may occur.

It is to be understood that the present invention is operable in the absence of mirrors to define an optical resonator. However, since an oscillator permits more efficient conversion than single pass operation, the following discussion is based on the utilization of a Raman oscillator or optical resonator.

The Raman oscillator equation is given by $$\beta = 1 - \exp(\beta g L / \ln R) \quad (1)$$

where $\beta = \phi_s/\phi_p$ is the photon conversion efficiency, R is the reflectivity of the output coupler, $\phi_s$ is the generated intracavity photon/cm².sec at the Stokes frequency, $\phi_p$ is the pump flux, g is the gain per unit length, and L is the length of the active medium. This equation was derived including pump depletion but with constant density of the interaction medium. Thus Eq. (1) is valid if the number density, N, integrated over the interaction volume is larger than the number of Stokes photons generated, or alternatively, if the atoms recirculate quickly back down to the Raman "ground" level via the cascade channels as illustrated in FIG. 1.

The fraction of Stokes photons extractable as output is simply given by $\beta(1-R)$. By maximizing $\beta(1-R)$ vs R, one obtains $$[\beta(1-R)]_{max} = 1 - R\left(1 + \frac{(\ln R)^2}{gL}\right) \quad (2)$$

Substituting Eq. (2) into (1) results in $$\exp\left(-\frac{R}{1-R} \ln R - \frac{gL}{\ln R}\right) = \frac{R}{1-R} \frac{(\ln R)^2}{gL} \quad (3)$$

which relates the optimal output coupling for a given intrinsic gain of the Raman medium. The solution of Eq. (3) may be used in Eq. (2) to calculate the maximum output extractable from the oscillator.

Thus for gL greater than 10, Stokes photon output may be as large as 90% of the pump laser photons with output coupling mirrors of 5% or less in reflectivity. These calculations are performed for an idealized oscillator where there exists no loss in the Raman medium other than the reflection loss of the output coupler. Loss inherent in the medium will reduce the maximum extractable output by the ratio of $-\ln R/(\alpha - \ln R)$. Under high-gain conditions in which R may be as small as 5%, the Stokes output will not be reduced by more than a factor of two if the medium loss $\alpha$ is no greater than 3.

For the near resonant Raman scattering process discussed herein, the gain coefficient may be written $$g = \frac{r_e^2}{2\pi} \frac{c^2}{\Gamma(\gamma^2 + \Delta\nu^2)} f_{4P1/2 - 6D3/2} f_{6D3/2 - 7P1/2} N_{4P} \Phi_p, \quad (4)$$

where $r_e$ is the classical radius of an electron, c is the speed of light, $\Gamma$ is the line width of potassium vapor in inverse centimeters, $\gamma$ is the laser line width in inverse centimeters, $\Delta\nu$ is the detuning in inverse centimeters, f is the oscillator strengths of indicated transitions, and $N_{4P}$ is the density of the 4P level and where $f_{4P1/2 - 6D3/2} = 2.18 \times 10^{-3}$ $f_{6D3/2 - 7P1/2} = 1.83$ $\Gamma \sim 0.03$ cm$^{-1} = 10^9$ cycles/sec for potassium vapor pressure at $\sim 500°$ K.

$\Delta\nu \sim 3$ cm$^{-1} = 10^{11}$ cycles/sec and maximum detuning is $\sim 3$ cm$^{-1}$ for the 15.9 μm output, g may be calculated to be $$g = 4.5 \times 10^{-39} N_{4P} \phi_p \text{ (cm}^{-1}\text{)}. \quad (5)$$

Figure 2:
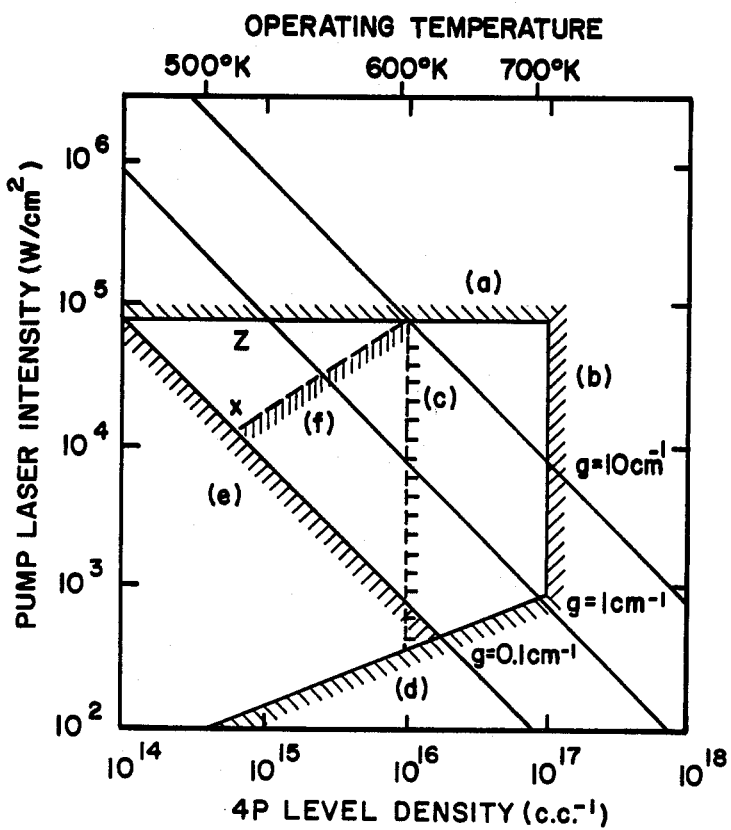
FIG. 2 is a graphic representation of 4P level density for potassium versus laser pump intensity with representative gain coefficient curves related to the desirable operating regime.

By converting the photon flux into W/cm², Eq. (5) is plotted in FIG. 2 as shown by the solid diagonal lines for various values of g. The desirable operating regime for potassium is bounded by the hatch marks and labeled as Z.

The pump laser flux should be limited to values such that the power broadened linewidth, $\Delta\nu_B$, of the $4P \rightarrow 6D$ transition is no larger than the required 16μ m output linewidth such as 0.07 cm$^{-1}$. $\Delta\nu_B$ is given by $$\Delta\nu_B = (\mu_{4P-6D} E/h) \quad (6)$$

where $\mu_{4P-6D}$ is the transition dipole of the $4P-6D$ transition and is $=0.5$ debye, and E is the pump laser electric field. For $\Delta\nu_B = 0.07$ cm$^{-1}$, E should be limited to less than 28 esu or 70 kW/cm² as indicated by boundary (a) in FIG. 2.

Boundary (b) indicates that the limit of the operating K-vapor density should be less than a few torr owing to the fact that at higher pressures the collision quenching times $\tau_q$ of the 4P level becomes comparable to or less than a desired laser pulse-width of, for example, 0.5 μ sec. However, before approaching this quenching limit, the energy pooling reaction between 4P levels such as

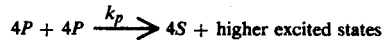

effectively limits the operating density to less than about $10^{16}$cc$^{-1}$, at which density, assuming $k_p$ to be gas kinetic, results in 4P residence times ($\tau'$) of $\sim 1$ μ sec. This more realistic boundary is indicated by (c) in FIG. 2. Coupling between the $4P_{1/2}$ and $4P_{3/2}$ level occurs at gas kinetic frequencies and this does not deplete the 4P level density. Since these sublevels can be closely coupled ($<1$ μ sec) with a few torr of a buffer gas in the working region, such as, for example, Ar or He, within a laser pulse time of approximately a microsecond, all the atoms in the 4P level can couple with the radiation field through the 4P$_{1/2}$ level without appreciable quenching of the 4P level to the ground level.

Other 4P level disappearance mechanisms, such as diffusion to the walls followed by deactivation are of the order of tens of milliseconds with a buffer gas pressure of ~1 torr. Radiative trapping times are governed mainly by the leakage of radiation through the wings of the absorption and emission profile, as determined by the natural linewidth of the resonance transition, under operating total pressures (buffer gas) of less than 10 torr. The trapping times ($\tau_t$) are related to the radiative lifetime, $\tau_{rad}$, by $$\tau_t = \tau_{rad}(\delta\ N l)^{1/2} \quad (7)$$

where N is the number density and $\delta$ is given by $$\sigma = \pi\ r_e \frac{f_{4S-4P}}{\gamma N} \quad (8)$$

For $\gamma_N \approx 1.3\times 10^{-3}$ cm$^{-1}$ ($\tau_{rad} \approx 26$ nsec), and $f_{4S-4P} = 0.693$, $\delta$ is equal to $4.7\times 10^{-10}$ cm$^2$. Thus $\tau_t$ is $\approx 6\ \mu$ sec for N=1×10$^{14}$cc$^{-1}$ and l, the vapor cell transverse linear dimension, is equal to 1 cm.

Boundary (d) sets a lower bound on the pump flux below which the possible loss per centimeter in the system may be expected to reduce the medium overall gain appreciably. The boundary is drawn fro $\alpha/L \approx g/4$. The loss is due to dimer absorption; thus $\alpha$ is scaled as the dimer concentration relative to a previously determined experimental condition for potassium.

In order to limit the oscillator linear dimension to reasonable lengths of not more than about 1 meter, and yet be able to achieve overall gL of 10 or larger, the gain coefficient of the medium should be greater than 0.1 cm$^{-1}$. This results in the operating boundary indicated by (e) in FIG. 2.

A final factor which must be considered in arriving at an operating condition for the oscillator is to optimize the utilization of pump and prime photons. In order to obtain a 1 mJ 16 $\mu$ m laser, $8\times 10^{16}$ photons must be generated. Assuming a 30% conversion efficiency which should be readily achievable as indicated by the discussion of the Raman oscillator, $2.7\times 10^{17}$ pump photons must be available for conversion. The number of 4P levels necessary for the conversion process should be at least $8\times 10^{16}$ molecules assuming no recirculation. In order to maintain a relatively constant gain coefficient during the conversion process, five times the necessary number, or $4\times 10^{17}$ 4P levels, should be available in the gain medium. The preparation of more 4P levels than is necessary reflects in an unnecessary stringent requirement on the prime laser. Given these requirements, Eq. (5) may be recast as $$\frac{4\times 10^{17}}{A\times L}\frac{2.7\times 10^{17}}{A\times \tau_p} = 2.22\times 10^{38}\ g. \quad (9)$$

where A is the active cross-sectional area of the oscillator, and $\tau_p$ is the required pulsewidth of 0.5 $\mu$ sec. By requiring the gain length, L, along the optical axis to be no less than 10 times the transverse dimension, $\sqrt{A}$, of the laser tube, Eq. (9) may be solved to yield the density and flux for various values of g. The results are plotted as the diagonal dash line, (f), in FIG. 2. On the right-hand side of this line, the ratio of the longitudinal to transverse dimensions becomes less than 10, which is a less attractive geometry for laser operation. Thus the desirable operating region is the triangle region in FIG. 2 labeled Z bounded by the hatch marks. The various boundary conditions are summarized as follows:

(a) Power Broadening; Linewidth ~0.07 cm$^{-1}$
(b) Collisional Quenching ($\tau q \lesssim 1\ \mu$ sec);
(c) Excited State Pooling ($\tau' < 1\ \mu$ sec);
(d) Gain Medium Loss ($\alpha/L \approx g/4$);
(e) Device Length $\geq 1$ meter for $gL \geq 10$;
(f) Aspect Ratio, $L/\sqrt{A} = 10$ One such operating condition is shown by "X" in FIG. 2. For the design point, X, A=7 cm$^2$; L=1m; gL=20; Ip=29 kW/cm$^2$; N$_{4P}$=5.7×10$^{14}$ cc$^{-1}$.

To the extent recirculation exists, the factor of five in the required number of 4P levels is not necessary to maintain a constant 4P density. The stimulated Raman time scale ($\tau_{stim}$) is given by $$\tau_{stim} = 1./gc \quad (10)$$

for g=0.1 cm$^{-1}$, $\tau_{stim}$ is approximately 0.3 nsec, which is much shorter than the pulsewidth. Thus, to the extent it is present, recirculation will establish a steady state concentration of 4P levels. Accordingly, this reduces the total 4P levels needed for conversion and this will permit a reduction in the 7699 Å output needed.

Directing attention now to the priming and pumping lasers, in order to achieve a 1 mJ per pulse 16 $\mu$ m output, a 100 mJ per pulse ($2.7\times 10^{17}$ photons) of pumping photons around 5343 A and less than 100 mJ per pulse ($4\times 10^{17}$ 4P levels prepared via saturated absorption) of 7699 Å photons are necessary for the conversion process. The linewidth required of the pump laser is governed by the required 16 $\mu$ m output linewidth of 0.07 cm$^{-1}$, or ~0.02 Å at around 5343 Å. The required linewidth of the 7699 Å laser is rather moderate.

For direct priming, the preparation of the 4P$_{1/2}$ level may be achieved by saturating the 4S$_{1/2}$ to 4P$_{1/2}$ transition using at or about 7699 Å radiation. The major requirement on the priming laser is that over the output bandwidth of the laser, the energy/cm$^2$ must be much larger than the saturation energy of the 4S$_{1/2} \rightarrow$ 4P$_{1/2}$ transition. In the wings of the absorption profile of this transition, the absorption cross section is given by $$\delta = \pi\ r_e f_{4S-4P}(\gamma_N/\gamma^2_N + \Delta\nu^2) \quad (11)$$

where $\Delta\nu$ is the width of the laser. A 1 Å bandwidth (or ~1.7 cm$^{-1}$) output may be readily achieved with a conventional expanding telescope and a suitable grating tuned dye laser. Thus $\delta$ is $10^{-16}$ cm$^2$ in the wings of the absorption profile. The saturation energy (E$_s$) is given by $$E_s = h\nu/2\delta \quad (12)$$

or E$_s$=1.3 mJ/cm$^2$ in the wings. Since the energy of the laser output is ~15 mJ/cm$^2$, a laser as discussed above is sufficiently intense to saturate the 4S→4P transition. At line center, using a doppler broadened width of 0.02 cm$^{-1}$, the E$_s$ is only 4.3nJ/cm$^2$. Thus with a modest laser bandwidth of 1 Å, most of the energy output may be efficiently utilized in preparing the 4P level. Radiative trapping retains the 4P level population for tens of $\mu$sec as discussed previously. Thus as long as actuation of the priming laser precedes the pump laser by not more than a few $\mu$ sec, sufficient 4P density will be present for conversion. In view of the above, it will now be seen that temporal timing between the pump and prime lasers is not critical.

Because of the relatively high repetition rates required for isotope separation, coaxial flashlamps for the priming and pumping lasers do not operate satisfactorily. Accordingly, these lasers may, for example, be of the type utilizing "vortex" flashlamps. Broadly, such flashlamps utilize an arc held in position by a swirling gas vortex. For a more complete discussion of vortex flashlamps and lasers utilizing same, reference is made to "0.2-W Repetitively Pulsed Flashlamp-Pumped Dye Laser", M. E. Mack, Appl. Phys. Lett., 19, 108 (1971); "Vortex Stabilized Flashlamps for Dye Laser Pumping", M. E. Mack, Appl. Optics, 13, No. 1 (1974); and U.S. Pat. No. 3,911,375 issued Oct. 7, 1975, which are incorporated herein by reference as if set out at length herein.

In the case of operation of the priming laser at 7699 Å, DOTC (3,3'-Diethyloxytricarbocyanine Iodide) combined with CVP (Cresyl Violet Perchlorate) as an additive may be used. Other dyes may also be used, such as HITC (hexamethylindotricarbocyanine-iodide) and DBQDC (diethyl-bromoquinodicarbocyanine-iodide).

For 5343 Å operation, Coumarin 6 provides satisfactory operation. Another dye that may be considered is Coumarin 102, especially if Coumarin 102 is mixed with an acidic solution of perchloric acid.

Figure 3:
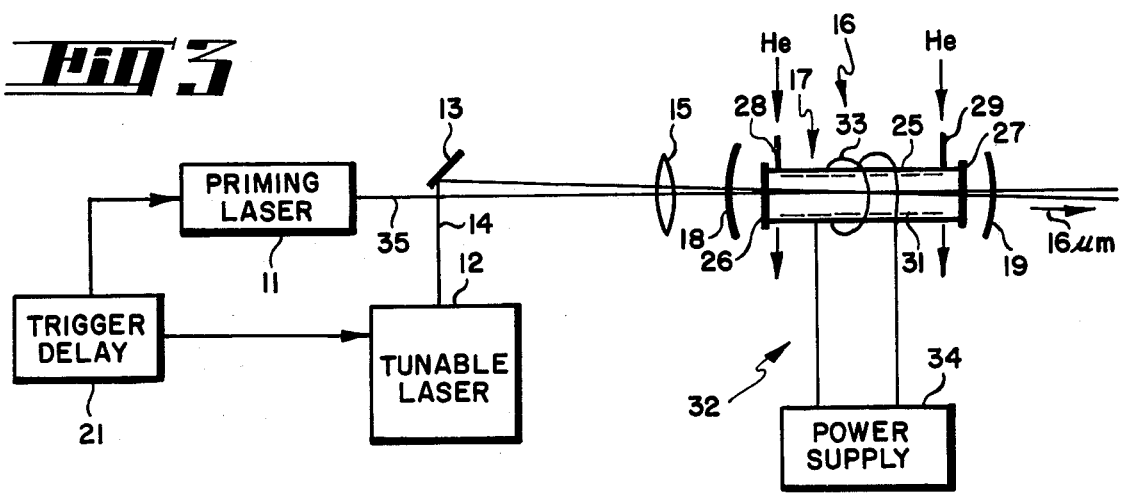
FIG. 3 is a schematic diagram of an embodiment for carrying out the present invention where the priming and pumping laser beams are not combined prior to their utilization.

Directing attention now to FIG. 3 which is a schematic diagram of apparatus for generating an output laser beam in accordance with the invention, which comprises a priming laser 11 at the appropriate wavelength (4047 Å, 7699 Å for potassium, 8945 Å for cesium, for example), a tunable pumping laser 12 at the appropriate wavelength (for potassium-5343 Å for 16 $\mu$ m output, 5832 Å for 8.49 $\mu$ m output; for cesium-8777 Å for 15.6 $\mu$ m output), a fully reflective mirror 13 for receiving the pumping laser beam 14, a focusing lens 15 for receiving and focusing both laser beams, and an optical resonator generally designated by the numeral 16 comprising a sealed heat pipe 17 disposed between two mirrors 18 and 19. Conventional trigger delay circuit means 21 are provided for triggering the pumping laser with respect to the priming laser at the time required for the active medium being used. For potassium, for example, the pumping laser should be triggered within a few microseconds of the priming laser when the desired 4P density has been provided by the priming laser.

The heat pipe 17 is comprised of an elongated tube member 25 formed of a high temperature material such as boron nitride, quartz, alumina and the like and its ends are closed as by potassium chloride windows 26 and 27 which are transparent to the laser beams of interest. Gas flow means 28 and 29 are provided adjacent each window to provide a flow of an inert gas such as helium across the inner surfaces of the windows to prevent condensation of potassium on the windows, as well as a buffer gas in the centrally disposed working region. Inside the tube member 25 and intermediate the windows 26 and 27 is a wick 31 comprised of stainless steel screen. Exterior of the tube member 25 at its central portion is heating means 32 to provide in this region inside the tube member a temperature sufficient to vaporize the source of metallic vapor such as potassium (about 380° C.) disposed on the wick 31. The heating means 32 may comprise, for example, a heater coil 33 connected to a suitable and controllable source of current 34. The heating means is, for potassium, preferably controlled to provide a density of about $10^{14}$ to $10^{16}$ atoms/cm$^3$ at about 380° C. The wick functions to collect the potassium vapor, which in combination with the buffer gas, comprises the active medium. The vapor condenses as it migrates toward the cooler ends of the tube member. Thus, as the vapor migrates towards the ends of the tube member, it is cooled, condenses on the wick and flows back to the center portion where it is revaporized. The maximum temperature should not be in excess of about 1000° C. at a pressure of about 15 Torr with a maximum pressure in the heat pipe of about 100 Torr.

For a more complete discussion of heat pipes for use with alkali metallic vapors suitable for present purposes, reference is made to U.S. Pat. No. 3,654,567 issued Apr. 4, 1972 and "Emission Spectra of Alkali-Metal Molecules Observed with a Heat-Pipe Discharge Tube" by P. P. Sorokin and J. R. Lankard, J. Chem. Physics, Vol. 33, No. 5, 13 Oct. 1971, pp. 3810–3813, which are incorporated herein by reference as if set out at length therein.

Whereas, as shown by way of example in FIG. 3, the pumping laser beam 14 of the tunable laser 12 is reflected from the edge or edge portion of the fully reflective mirror 13 and through the tube member or heat pipe 17, the laser beam 35 from the priming laster 11 is directed to pass close to the aforementioned edge of the mirror 13 and through the heat pipe 17.

Both laser beams are focused by lens 15, formed of quartz, for example, to the same region in the active medium in the central portion of the heat pipe 17. The active medium may comprise, for example, about 1% alkali metallic vapor and the balance a suitable buffer gas such as helium. Upon production of potassium vapor in the buffer gas in the central portion of the heat pipe by actuating the heating means to provide an internal temperature of about 380° C. to vaporize the potassium at a pressure of a few torr, the shorter wavelength radiation at 4047 Å from the priming laser 11 primes the potassium vapor to the $5P_{1/2}$ level, which then trickles down to the $4P_{1/2}$ level as previously discussed. The longer wavelength radiation at 5343 Å from the pumping laser 12 then pumps the potassium vapor from the $4P_{1/2}$ level to the virtual upper level near the $6D_{3/2}$ level. The 16 $\mu$ m radiation then produced is emitted along the same path as that of the pumping laser beam. Varying the wavelength of the pumping laser beam 14 is effective to tune or vary the wavelength of the desired output laser beam when the atoms at the virtual upper level determined by the wavelength of the pumping laser relaxes to the $7P_{1/2}$ final level.

Provision of the mirror 18 such as a dichroic mirror at the input end of the heat pipe that will pass the priming and pumping wavelengths but reflect 16 $\mu$m radiation, in combination with the mirror 19 at the outlet end of the heat pipe that is only partly reflective to 16 $\mu$ m, provides the optical resonator 16 having a 16 $\mu$ m output laser beam.

Figure 4:
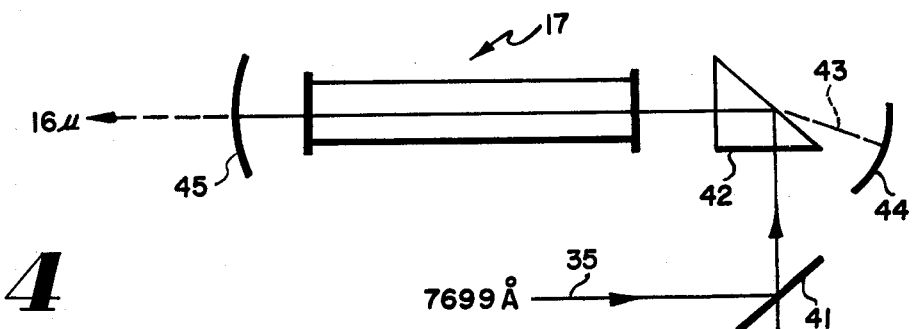
FIG. 4 is a schematic diagram of another embodiment for carrying out the present invention showing the use of a dichroic mirror and prism for combining the priming and pumping laser beams.

As shown in FIG. 4, the priming and pumping laser beams 35 and 14 may be combined by a dichroic mirror 41 and directed to a prism 42, formed, for example, of potassium chloride for a potassium laser, that internally reflects only the priming and pumping laser beams, thereby permitting the desired output beam 43, such as 16 $\mu$ m, to exit from the prism, albeit refracted, as shown by way of example in FIG. 4. A fully reflective mirror 44 is provided to receive the desired output wavelength exiting from the prism 42 and reflect it back through the prism and into the heat pipe 17. The fully reflective mirror 44 in combination with a partially reflective mirror 45 defines the optical resonator.

Figure 5:
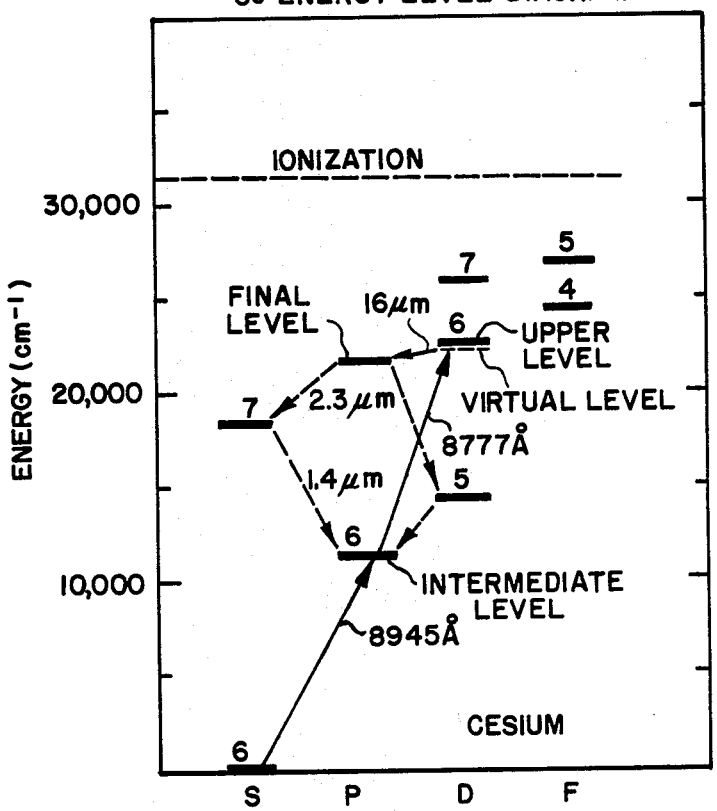
FIG. 5 is an energy level diagram for cesium showing priming and pumping steps in accordance with the invention.

Referring now to FIG. 5, it will be seen that the cesium system is similar to that of potassium as shown in FIG. 1. For cesium, the wavelength of priming and pumping laser beams must be at respectively about 8945 Å ($6S_{1/2} \to 6P_{1/2}$) and 8777 Å ($6P_{1/2} \to 6D_{3/2}$) as indicated in FIG. 5. If desired, both wavelengths may be derived in conventional manner from a single dye laser using Kodak IR-144 dye.

The system shown in FIG. 5 utilizes the cesium $6D_{3/2}$ and $7P_{3/2}$ transition at 642.6 cm$^{-1}$ (15.56 μ m) as the near resonant transition to generate 16 μ m output with a detuning equal to about 18 cm$^{-1}$.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A tunable pulse laser system comprising:
    (a) a resonant optical cavity comprising heat pipe means disposed between a pair of mirrors, said heat pipe means comprising a chamber having an evaporation portion intermediate its ends for providing therein at subatmospheric pressure a metallic vapor from a metallic vapor source material disposed in said evaporation portion, said heat pipe means further comprising means for introducing into said heat pipe means an inert gas at least a portion of which mixes with said vapor to provide an active medium at subatmospheric pressure;
    (b) priming laser means for priming the vapor of said active medium to a predetermined intermediate level;
    (c) tunable laser means for pumping said primed vapor to a virtual upper laser level adjacent a predetermined upper level and producing an output laser beam, said predetermined upper level being one to which a transition from said intermediate level is an optically allowed transition; and
    (d) delay trigger circuit means for triggering said pumping laser with respect to said priming laser after said priming laser has been triggered and during the time said active medium is primed to said intermediate level by said priming laser.

2. A laser as in claim 1 wherein:
    said source material is taken from the group consisting of lithium, potassium, rubidium, cesium and sodium.

3. A laser as in claim 1 wherein:
    said source material is potassium, said intermediate level is the $4P_{1/2}$ level and said upper level is the $6D_{3/2}$ level.

4. A laser as in claim 3 wherein said heat pipe means includes means for maintaining the operating temperature between about 470° K. and 580° K. and further including means for maintaining the pump laser intensity, between about $10^4$ to $10^5$ watts per square centimeter in the active medium.

5. A laser as in claim 1 wherein:
    said source material is potassium, said intermediate level is the $4P_{1/2}$ level and said upper level is the $5D_{3/2}$ level.

6. A laser as in claim 5 wherein said heat pipe means includes means for maintaining the operating temperature between about 470° K. and 580° K. and further including means for maintaining the pump laser intensity between about $10^4$ to $10^5$ watts per square centimeter in the active medium.

7. A laser as in claim 3 wherein:
    said laser means for priming the vapor has an output laser beam at about 4047 Å and said tunable laser means has an output laser beam tunable about 5343 Å.

8. A laser as in claim 3 wherein:
    said laser means for priming the vapor has an output laser beam at about 7699 Å and said tunable laser means has an output laser beam tunable about 5343 Å.

9. A laser as in claim 5 wherein:
    said laser means for priming the vapor has an output laser beam at about 4047 Å and said tunable laser means has an output laser beam tunable about 5832 Å.

10. A laser as in claim 5 wherein:
    said laser means for priming the vapor have an output laser beam at about 7699 Å and said tunable laser means has an output laser beam tunable about 5832 Å.

11. A laser as in claim 1 wherein:
    said source material is cesium, said intermediate level is the $6P_{1/2}$ level and said upper level is the $6D_{3/2}$ level.

12. A laser as in claim 11 wherein:
    said laser means for priming the vapor has an output laser beam at about 8945 Å and said tunable laser means has an output laser beam tunable about 8777 Å.

13. A laser as in claim 8 wherein: said active medium has a predetermined saturation energy per square centimeter for the $4S_{1/2} \to 4P_{1/2}$ transition and the energy per square centimeter of the output laser beam at about 7699 Å is larger than the said saturation energy of the said $4S_{1/2} \to 4P_{1/2}$ transition.

14. A laser as in claim 10 wherein: said active medium has a predetermined saturation energy per square centimeter for the $4S_{1/2} \to 4P_{1/2}$ transition and the energy per square centimeter of the output laser beam at about 7699 Å is larger than the said saturation energy of the said $4S_{1/2} \to 4P_{1/2}$ transition.

15. A laser as in claim 3 wherein:
    the pressure in said evaporation portion is less than about 100 Torr.

* * * * *

UNITED STATES PATENT AND TRADEMARK OFFICE
CERTIFICATE OF CORRECTION

PATENT NO. : 4,151,486
DATED : April 24, 1979
INVENTOR(S) : Irving Itzkan and Robert T.V. Kung It is certified that error appears in the above-identified patent and that said Letters Patent are hereby corrected as shown below:

Col. 3, line 53, for "$\exp\left(-\frac{R}{1-R}\ln R - \frac{gL}{\ln R}\right) = \frac{R}{1-R}\frac{(\ln R)^2}{gL}$"

read -- $\exp\left(-\frac{R}{1-R}\ln R + \frac{gL}{\ln R}\right) = \frac{R}{1-R}\frac{(\ln R)^2}{gL}$ --; Col. 4, line 28, for "$g = 4.5 \times 10^{-39} N_{4P} \phi_p \ (cm^{-1})$." read --

$g = 4.5 \times 10^{-39} N_{4P} \Phi_p \ (cm^{-1})$.--; Col. 4, line 65, for "(< 1μsec)"

read -- (<<1 μsec)--; Col. 5, line 27, for "fro" read--for--.

Signed and Sealed this

Seventh Day of August 1979

[SEAL]

Attest:

LUTRELLE F. PARKER

Attesting Officer   Acting Commissioner of Patents and Trademarks